US009653223B2

(12) United States Patent
Shimada (10) Patent No.: US 9,653,223 B2
(45) Date of Patent: May 16, 2017

(54) SWITCH

(71) Applicant: Valeo Japan Co., Ltd., Saitama (JP)

(72) Inventor: Hiroyuki Shimada, Tokyo (JP)

(73) Assignee: Valeo Japan Co., LTD (JP)

( * ) Notice: Subject to any disclaimer, the term of this patent is extended or adjusted under 35 U.S.C. 154(b) by 0 days.

(21) Appl. No.: 14/272,594

(22) Filed: May 8, 2014

(65) Prior Publication Data

US 2014/0353131 A1    Dec. 4, 2014

(30) Foreign Application Priority Data

May 31, 2013   (JP) ................................. 2013-116504

(51) Int. Cl.
| | | |
|---|---|---|
| *H01H 1/06* | (2006.01) | |
| *H01H 3/16* | (2006.01) | |
| *F16H 59/10* | (2006.01) | |
| *H01H 19/58* | (2006.01) | |

(52) U.S. Cl.
CPC ............. *H01H 3/16* (2013.01); *F16H 59/105* (2013.01); *H01H 1/06* (2013.01); *H01H 19/585* (2013.01); *H01H 2300/02* (2013.01)

(58) Field of Classification Search
CPC ..... H01H 1/365; H01H 1/2016; H01H 31/026
USPC .................................. 200/547, 61.39; 439/17
See application file for complete search history.

(56) References Cited

U.S. PATENT DOCUMENTS

| | | | |
|---|---|---|---|
| 2006/0084292 A1* | 4/2006 | Nishikawa ............. | B60Q 1/441 439/74 |
| 2009/0272636 A1* | 11/2009 | Isberg ...................... | H01H 1/06 200/279 |
| 2010/0224468 A1 | 9/2010 | Matsuhashi et al. | |
| 2013/0306448 A1* | 11/2013 | Inotsuka .................... | 200/61.88 |

FOREIGN PATENT DOCUMENTS

| | | | |
|---|---|---|---|
| EP | 0 661 481 A2 | 7/1995 | |
| JP | 06-223672 | 8/1994 | |
| JP | 2001330527 | * 1/2001 | ............. H01H 13/14 |
| JP | 2007-012558 A | 1/2007 | |
| JP | 2009-301801 A | 12/2009 | |
| JP | 2012-074310 | 4/2012 | |

OTHER PUBLICATIONS

Extended European Search Report issued Aug. 22, 2014 for corresponding European Application No. 14 16 6737.

* cited by examiner

*Primary Examiner* — Renee Luebke
*Assistant Examiner* — Ahmed Saeed
(74) *Attorney, Agent, or Firm* — Fishman Stewart PLLC

(57) ABSTRACT

A switch comprising a body case, a movable board that is movably disposed in the body case and a movable contact point disposed in the movable board is disclosed. A fixed contact point is provided in the body case with a lubricating agent applied thereto. The movable contact point makes pressure-contact with the fixed contact point, and is connected and disconnected from the fixed contact point corresponding to a position of the movable contact point changing by moving the movable board. Grooves are (Continued)

formed in a contact portion of the movable contact point with the fixed contact point to be arranged along the movement direction of the movable contact point.

8 Claims, 7 Drawing Sheets

SWITCH

CROSS-REFERENCE TO RELATED APPLICATION

This application claims priority under 35 USC 119 from Japanese Patent Application No. 116504/2013 filed on May 31, 2013, the disclosure of which is incorporated by reference herein.

BACKGROUND OF THE INVENTION

Field of the Invention

The present invention relates to a switch.

Description of the Related Art

For example, Japanese Patent Laid-Open No. 2012-074310 discloses an inhibitor switch that is mounted on a vehicular automatic transmission to detect a selection range of a shift lever.

Figure 7:
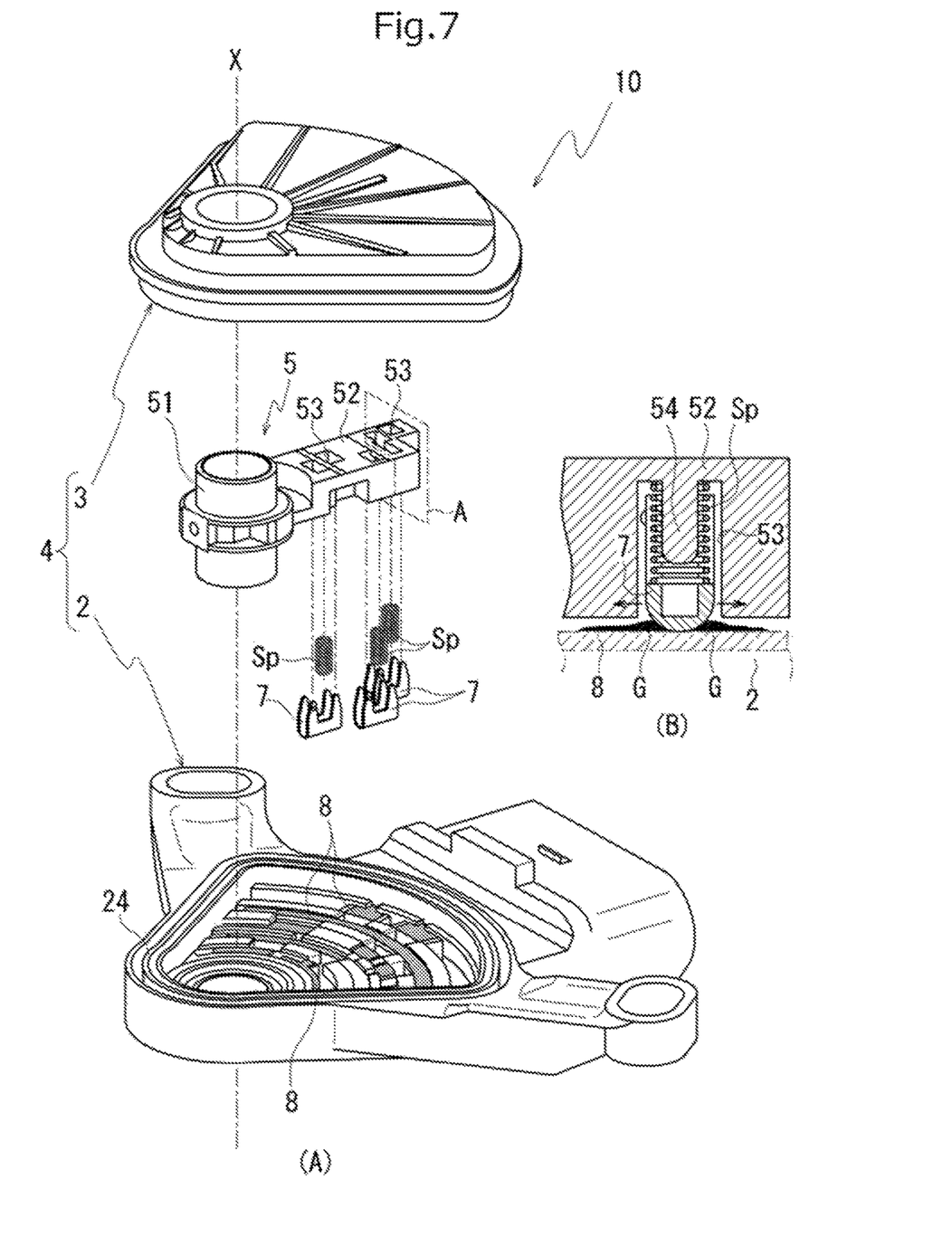
FIG. 7A is exploded perspective views showing an inhibitor switch.
FIG. 7B is a cross section showing a movable board, taken along a plane A in FIG. 7A and a diagram for explaining an arrangement of a movable contact point in the movable board.

FIG. 7A and FIG. 7B are diagrams for explaining an inhibitor switch 10 according to the conventional switch that is represented by the inhibitor switch disclosed in Japanese Patent Laid-Open No. 2012-074310, wherein FIG. 7A is an exploded perspective view showing the inhibitor switch 10, and FIG. 7B is a cross section showing a movable board 5, taken along a plane A in FIG. 7A and is a diagram for explaining an arrangement of movable contact points 7 in the movable board 5.

A body case 4 of the inhibitor switch 10 is formed by coupling a cover 3 to a peripheral wall 24 that surrounds an area of a pole board 2 where fixed contact points 8 are disposed, and the movable board 5 provided with the movable contact points 7 is provided inside the body case 4 to be rotatable around an axis line X.

The movable board 5 includes a cylindrical shaft portion 51 and a contact point holding portion 52 extending in a radial direction (radial direction of the axis line X) from the shaft portion 51, and each of the movable contact points 7 is accommodated in an accommodation hole 53 formed in the contact point holding portion 52 together with a spring Sp (refer to FIG. 7B).

Each of the movable contact points 7 projects downward to the side of the pole board 2 from the accommodation hole 53 by an urging force acting from the spring Sp, and is configured to make pressure-contact with the fixed contact point 8 exposed on an upper surface of the pole board 2 in a state where the movable board 5 is assembled in the body case 4.

An arm (member in the side of a shift lever) rotating in association with an operation of the shift lever is coupled to the shaft portion 51 of the movable board 5. When the shift lever is operated, the contact point holding portion 52 extending in the radial direction from the shaft portion 51 rotates around the axis line X in association with the operation of the shift lever. Thereby, the movable contact point 7 having made pressure-contact with the fixed contact point 8 moves in a circumferential direction around the axis line X.

In the inhibitor switch 10, when the movable board 5 rotates by the operation of the shift lever, the movable contact point 7 moves while sliding on the fixed contact point 8, thus causing a position of the movable contact point 7 around the axis line X to change.

Therefore, grease is applied inside the peripheral wall 24 that surrounds the area of the pole board 2 in which the fixed contact points 8 are provided, for reducing a sliding resistance to be generated at the time the movable contact point 7 slides on the fixed contact point 8. Accordingly, at the rotating of the movable board 5, the movable contact point 7 slides while scratching and separating the grease that has covered the upper surface of the fixed contact point 8, thereby retaining the contacting state between the movable contact point 7 and the fixed contact point 8.

However, since fluidity of the grease is generally lowered under low-temperature environments, there are some cases where the scratching and separating of the grease by the movable contact point 7 becomes insufficient.

In that case, there are some cases where the movable contact point 7 moving in association with rotation of the movable board 5 gets on the grease, which generates a non-contacting state between the movable contact point 7 and the fixed contact point 8 that should originally make contact with each other or a chattering phenomenon that the movable contact point 7 and the fixed contact point 8 are repeatedly connected/disconnected in a short cycle.

Therefore, it is required to cause the movable contact point 7 to certainly make contact with the fixed contact point 8 even in a case where the fluidity of the grease is low.

SUMMARY OF THE INVENTION

Accordingly, the present invention is made in view of the above-described problems, and an object of the present invention is to provide a switch which can appropriately prevent occurrence of a non-contacting state between a movable contact point and a fixed contact point.

According to an aspect of the present invention, a switch comprises a body case, a movable board that is movably disposed in the body case, a movable contact point disposed in the movable board, a fixed contact point that is provided in the body case to be fixed thereto and on which a lubricating agent is applied, wherein the movable contact point makes pressure-contact with the fixed contact point, and is connected to/disconnected from the fixed contact point corresponding to a position of the movable contact point changing by moving the movable board, and a plurality of grooves formed in a contact portion of the movable contact point with the fixed contact point to be arranged along the movement direction of the movable contact point.

According to the aspect of the present invention, since the plurality of grooves are formed in the contact portion of the movable contact point with the fixed contact point along the movement direction of the movable contact point, stress for pushing the movable contact point on the fixed contact point concentrates on a portion of the movable contact point between the grooves thereof. Therefore, the portion between the grooves in the movable contact point is pushed to the side of the fixed contact point by a force larger than the conventional movable contact point that is not provided with grooves.

Accordingly, even if the fluidity of the grease is low, the portion between the grooves in the movable contact point can certainly make contact with the fixed contact point by scratching and separating the grease. As a result, it is possible to appropriately prevent occurrence of the non-contacting state between the movable contact point and the fixed contact point that should originally make contact with each other to appropriately suppress generation of a chattering phenomenon.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIGS. 1A and 1B are diagrams for explaining an inhibitor switch according to an embodiment in the present invention, wherein

FIG. 7A and FIG. 7B are diagrams for explaining an inhibitor switch according to the conventional switch, wherein

DESCRIPTION OF THE PREFERRED EMBODIMENT

Hereinafter, a switch according to an embodiment in the present invention will be explained by taking an inhibitor switch mounted on a vehicle to be used for detection of a selection range of a shift lever, as an example.

Figure 1:
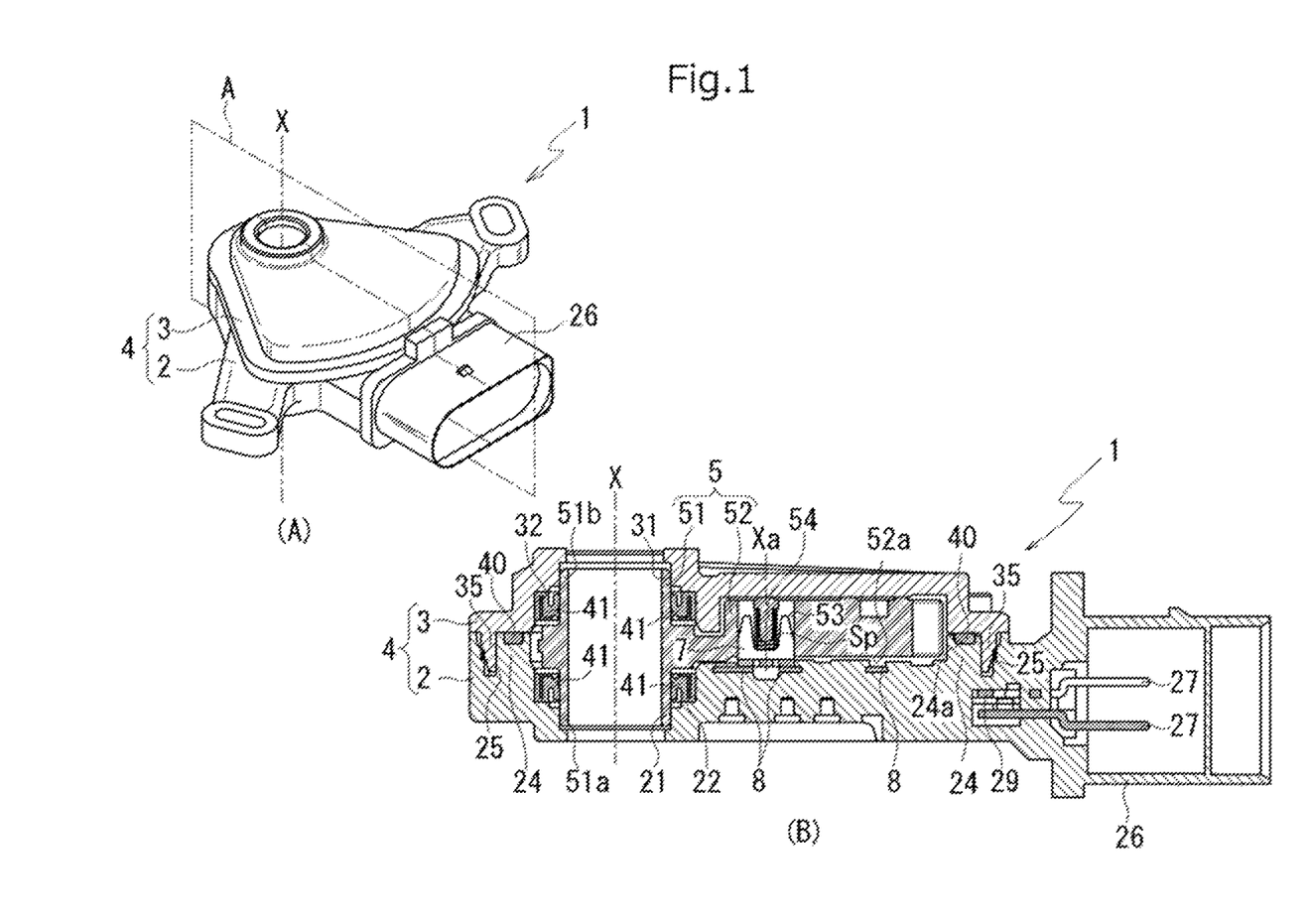
FIG. 1A is a perspective view showing the inhibitor switch according to the embodiment.
FIG. 1B is a cross section showing the inhibitor switch, taken along a plane A in FIG. 1A.

FIGS. 1A and 1B are diagrams for explaining an inhibitor switch 1 according to an embodiment in the present invention. It should be noted that in the following explanation, components identical to those in the inhibitor switch 10 according to the conventional example shown in FIG. 7A and FIG. 7b are referred to as identical codes. Further, for descriptive purposes, in FIG. 1B, a cover 3-side is indicated as an upward side and a pole board 2-side is indicated as a downward side.

As shown in FIGS. 1A and 1B, a body case 4 of the inhibitor switch 1 is formed by coupling a cover 3 to a peripheral wall 24 surrounding an area of a pole board 2 in which fixed contact points 8 are disposed, and a movable board 5 provided with movable contact points 7 is provided inside the body case 4 to be rotatable around an axis line X.

The movable board 5 includes a cylindrical shaft portion 51 and a contact point holding portion 52 linearly extending in a radial direction of the axis line X from the halfway position of the shaft portion 51 in the longitudinal direction, and the shaft portion 51 is coupled to a member in the side of a shift lever through an unillustrated coupling member.

Therefore, in the inhibitor switch 1 according to the present embodiment, the movable board 5 rotates around the axis line X in association with an operation with the shift lever, and at this time, a position of the movable contact point 7 disposed in the contact point holding portion 52 in the movable board 5 changes in the circumferential direction around the axis line X.

An accommodation hole 53 for the movable contact point 7 is formed in the contact point holding portion 52 to open downward to the side of the pole board 2, and the movable contact point 7 is accommodated together with a spring Sp in the accommodation hole 53.

A cylindrical spring holding portion 54 is provided in the accommodation hole 53, and one end side of the spring Sp in the longitudinal direction is supported by the spring holding portion 54.

The other end of the spring Sp makes contact with the movable contact point 7 to urge the movable contact point 7 downward to the side of the pole board 2. Therefore, the movable contact point 7 projects downward to the side of the pole board 2 from a lower surface 52a of the contact point holding portion 52, and makes pressure-contact with the fixed contact point 8 exposed on an upper surface of the pole board 2 by an urging force acting from the spring Sp.

In this state, the movable contact point 7 is arranged to be movable forward/backward in an axis line Xa in parallel to the axis line X by the spring Sp.

Here, a total of three movable contact points 7 are provided in the movable contact point 5 according to the present embodiment, and each of the movable contact points 7 is provided in the accommodation hole 53 corresponding thereto with the same configuration as the above configuration.

FIGS. 2A to 2D are diagrams for explaining the pole board 2.

Figure 2:
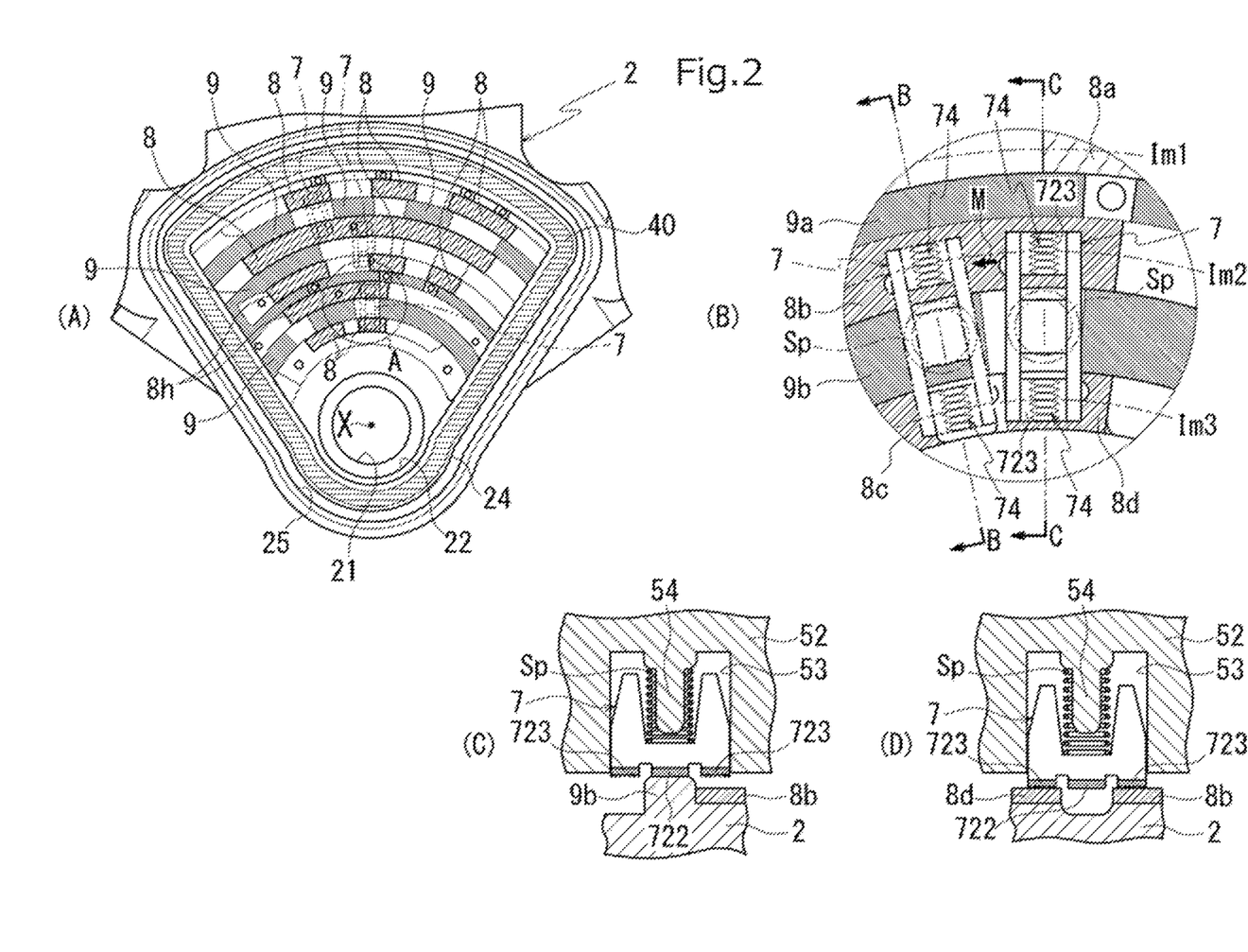
FIG. 2A is a plan view showing a pole board as viewed from above to the side of a cover, and is a diagram showing movable contact points making pressure-contact with fixed contact points in a virtual line.
FIG. 2B is an enlarged diagram showing an area A of the pole board in FIG. 2A.
FIG. 2C is a cross section showing the pole board, taken along lines B-B in FIG. 2B.
FIG. 2D is a cross section showing the pole board, taken along lines C-C in FIG. 2B.

In FIG. 2A and FIG. 2B, the fixed contact points 8 (8a to 8d) exposed on the upper surface of the pole board 2, projecting portions 9 (9a to 9c), and a packing 40 are illustrated by hatching for clarifying positions thereof.

In FIG. 2B to FIG. 2D, codes 8a to 8d are used respectively to the fixed contact points 8 to distinguish the fixed contact points 8 each, and codes 9a to 9c are used respectively to the projecting portions 9 to distinguish the projecting portions 9 each. Further, in FIG. 2B, the movable contact point 7 before the movement is shown by a solid line and the movable contact point 7 after the movement is shown by a virtual line for explaining how the movable contact point 7 having made contact with the fixed contact points 8 (8b, 8c and 8d) moves, and grooves 74 are schematically shown for showing positions of the grooves 74 provided in a contact point 723 of the movable contact point 7 with the fixed contact point 8.

The pole board 2 is formed integrally of a non-conductive resin material excellent in heat resistance, and a wiring member 29 (refer to FIG. 1B) connecting a connector terminal 27 of a connector portion 26 and each of the fixed contact points 8 is provided inside the pole board 2 by insert molding.

As shown in FIG. 2A, the fixed contact points 8 exposed on the upper surface of the pole board 2 in the side of the cover extend, each having a different length along the circumferential direction around the axis line X, at positions away by a predetermined distance from each other outside in a radial direction from the axis line X, and are each formed in an arc shape in a plan view.

As shown in FIG. 2B, the fixed contact point 8a, the fixed contact point 8b, the fixed contact point 8c and the fixed contact point 8d are respectively provided in an arc shape along virtual circles Im1, Im2 and Im3 each having a different radius around the axis line X.

It should be noted that in the following explanation, the fixed contact points 8a to 8d are indicated simply at the fixed contact point 8 unless particularly distinguished.

A plurality of the projecting portions 9 projecting closer to the front than the fixed contact point 8 on the sheet surface in FIG. 2A are provided between the fixed contact points 8 in the radial direction of the axis line X, and the projecting portions 9 are provided, as similar to the fixed contact point 8, each having a different length along the circumferential direction around the axis line X, at positions away by a predetermined distance from each other outside in the radial direction from the axis line X.

In the inhibitor switch 1 according to the present embodiment, the movable board 5 rotates around the axis line X in association with the operation of the shift lever, and at this time, the movable contact point 7 provided in the contact point holding portion 52 moves on the fixed contact point 8 with which the movable contact point 7 is in pressure-contact while sliding thereon, thus changing an angular position of the movable contact point 7 in the circumferential direction around the axis line X.

Therefore, a lubricating agent (for example, mineral grease) is applied on the surface of the fixed contact point 8 for reducing a sliding resistance at the time the movable contact point 7 moves thereon.

In the inhibitor switch 1, when the angular position of the movable contact point 7 around the axis line X changes, a getting-on portion 722, which will be described later, of the movable contact point 7 gets on the projecting portion 9, thereby moving the movable contact point 7 to a position away and above by a predetermined distance from the fixed contact point 8, and thus resolving the contacting state between the movable contact point 7 and the fixed contact point 8.

As shown in FIG. 2A, the area of the pole board 2 where the fixed contact points 8 are provided is formed in a substantial fan shape in a plan view, and the peripheral wall 24 is provided to surround this area.

A ring groove 24a (refer to FIG. 1B) is formed on an upper end of the peripheral wall 24 over an entire periphery thereof, and the packing 40 is provided in the ring groove 24a.

In the inhibitor switch 1 according to the present embodiment, at the time the pole board 2 and the cover 3 are assembled, the packing 40 mounted in the peripheral wall 24 is caused to make pressure-contact with a lower surface of the cover 3 to seal off a space inside the peripheral wall 24.

A fitting groove 25 is formed outside of the peripheral wall 24 to surround the peripheral wall 24 over an entire periphery thereof. A ring-shaped fitting wall 35 provided in the side of the cover 3 is fitted in the fitting groove 25 at the time the pole board 2 and the cover 3 are assembled, and at this time, contact portions between an outer periphery of the fitting wall 35 and the fitting groove 25 are coupled to each other by ultrasonic welding to form the body case 4. It should be noted that the cover 3 is also made of a non-conductive resin material excellent in heat resistance as similar to the pole board 2.

In a substantially fan-shaped area of the pole board 2 inside the peripheral wall 24, a through hole 21 is provided in a section corresponding to the fan top in this area to penetrate through the pole board 2 in the thickness direction, and a through hole 31 is provided also in the cover 3 assembled in the pole board 2 in a position in alignment with the through hole 21 to penetrate through the cover 3 in the thickness direction (refer to FIG. 1B).

Ring-shaped accommodation portions 22 and 32 are respectively formed on an upper surface of the pole board 2 in the side of the cover 3 and on a lower surface of the cover 3 in the side of the pole board 2 to surround the through holes 21 and 31 by a predetermined interval. Seal rings 41 are mounted in the accommodation portions 22 and 32 to be fitted therein.

In the inhibitor switch 1 according to the present embodiment, one end 51a of the shaft portion 51 in the movable board 5 and the other end 51b thereof are supported by the through holes 21 and 31 to be rotatable around the axis line X, and at this time, air-tightness inside the body case 4 is established by causing the seal ring 41 provided in each of the accommodation portions 22 and 32 to be in pressure-contact with the outer periphery of the shaft portion 51.

FIGS. 3A to 3D are diagrams for explaining the movable contact point 7.

FIGS. 4A to 4E are diagrams for explaining the grooves 74 provided in the movable contact point 7.

Figure 3:
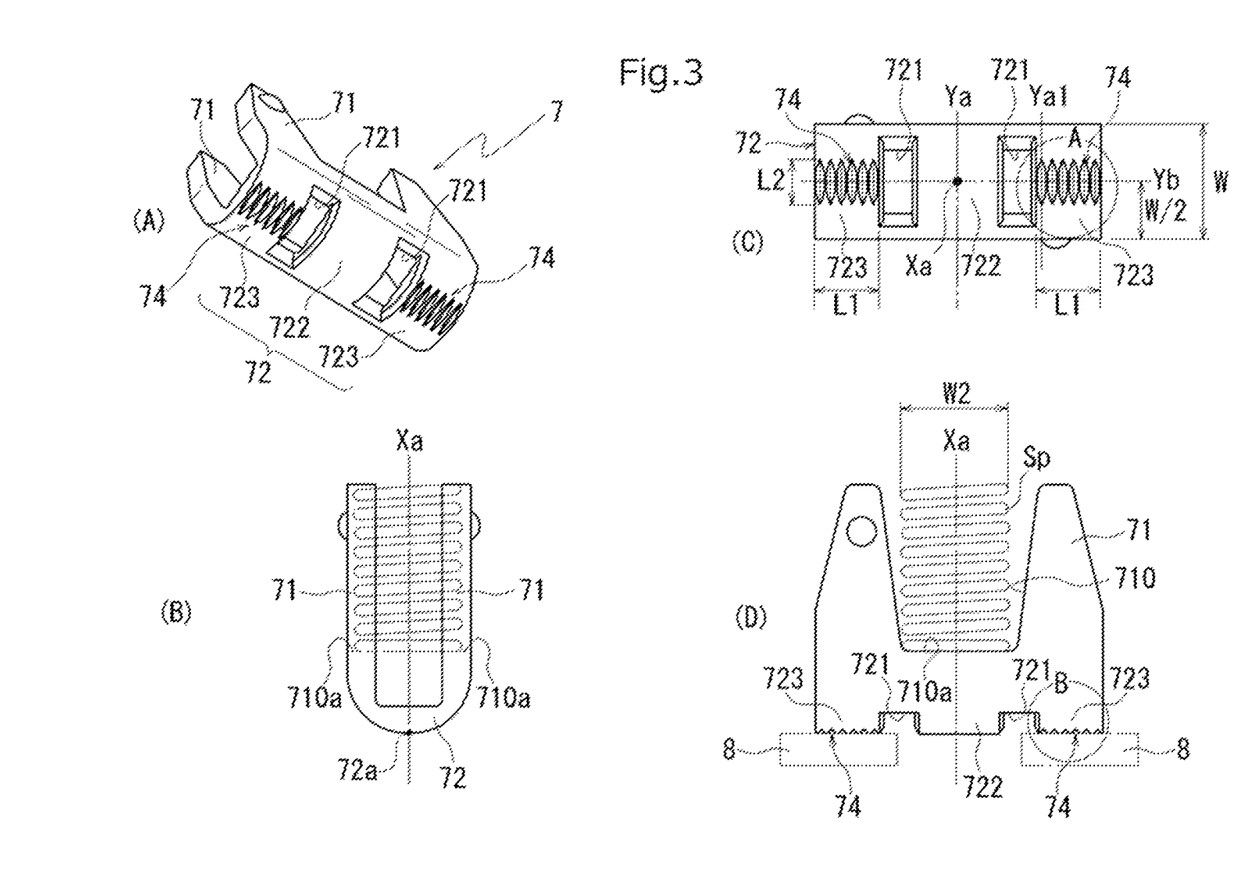
FIG. 3A is a perspective view showing the movable contact point as viewed from obliquely downward to the side of the pole board according to the embodiment.
FIG. 3B is a front view showing the movable contact point as viewed from one side of the pole board in a longitudinal direction according to the embodiment.
FIG. 3c is a plan view showing the movable contact point as viewed from downward to the side of the pole board according to the embodiment.
FIG. 3D is a side view showing the movable contact point as viewed from one side of the pole board in a width direction according to the embodiment.

As shown in FIGS. 3A and 3B, the movable contact point 7 is formed by bending one sheet of metallic plate to have a U-letter shape, and includes side wall portions 71 arranged in parallel to each other, and a connecting portion 72 connecting lower end portions of the side end portions 71 to each other.

An outer periphery of the connecting portion 72 is formed in such an arc shape that a center point (lower end 72a) in the width direction is positioned to the lowest side to the side of the pole board 2 as viewed from the one side in the longitudinal direction of the movable contact point 7, and this lower end 72a is a contact point with the fixed contact point 8.

As shown in FIG. 3C, the connecting portion 72 is formed in a substantially rectangular shape as viewed from downward to the side of the pole board 2, and two notches 721 are formed on a lower surface of the connecting portion 72 to the side of the pole board 2 to have an interval therebetween in the longitudinal direction (right-left direction in the figure) of the connecting portion 72.

The notches 721 pass through a center of the connecting portion 72 in the longitudinal direction, and are disposed in symmetrical positions around a straight line Ya extending in the width direction of the connecting portion 72. A section of the connecting portion 72 between the notches 721, 721 is formed as the getting-on portion 722 that gets on the projecting portion 9 as described above.

Side portions at the opposite side to the getting-on portion 722 across the notches 721 (both side portions of the connecting portion 72 in the longitudinal direction) are formed as contact portions 723 with the fixed contact points 8.

The contact portions 732 are also provided symmetrically around the straight line Ya, and the contact portion 723 of one side and the contact portion 723 of the other side around the straight line Ya each have the same length L1 in the longitudinal direction.

Grooves 74 are provided in each of the contact portions 723 to extend in the width direction of the connecting portion 72 along a straight line Ya1 in parallel to the straight line Ya. The grooves 74 are provided in parallel to each other in the longitudinal direction (right-left direction in FIG. 3C) of the connecting portion 72. The respective grooves 74 are formed by lining up sharp tip-shaped projecting portions 741 and sharp tip-shaped concave portions 742 alternately in the longitudinal direction of the connecting portion 72 (refer to FIG. 4B).

In the present embodiment, each of the movable contact points 7 is provided in the contact point holding portion 52 of the movable board 5 to be directed along a radial direction of a rotary shaft (axis line X) of the movable board 5, and the grooves 74 provided in the contact portion 723 of the movable contact point 7 are formed across the arc-shaped outer periphery of the contact portion 723 in the movement direction of the movable contact point 7 (width direction of the movable contact point 7).

As shown in FIG. 3C, each of the grooves 74 passes through a center (W/2) of the connecting portion 72 in the width W direction, and is disposed to bridge over a straight line Yb vertical to the straight line Ya. Lengths of the grooves 74 in the width direction as viewed from downward to the side of the pole board 2 are aligned to have substantially the same length L2, and a central part of each of the grooves 74 in the longitudinal direction is positioned on the straight line Yb.

Figure 4:
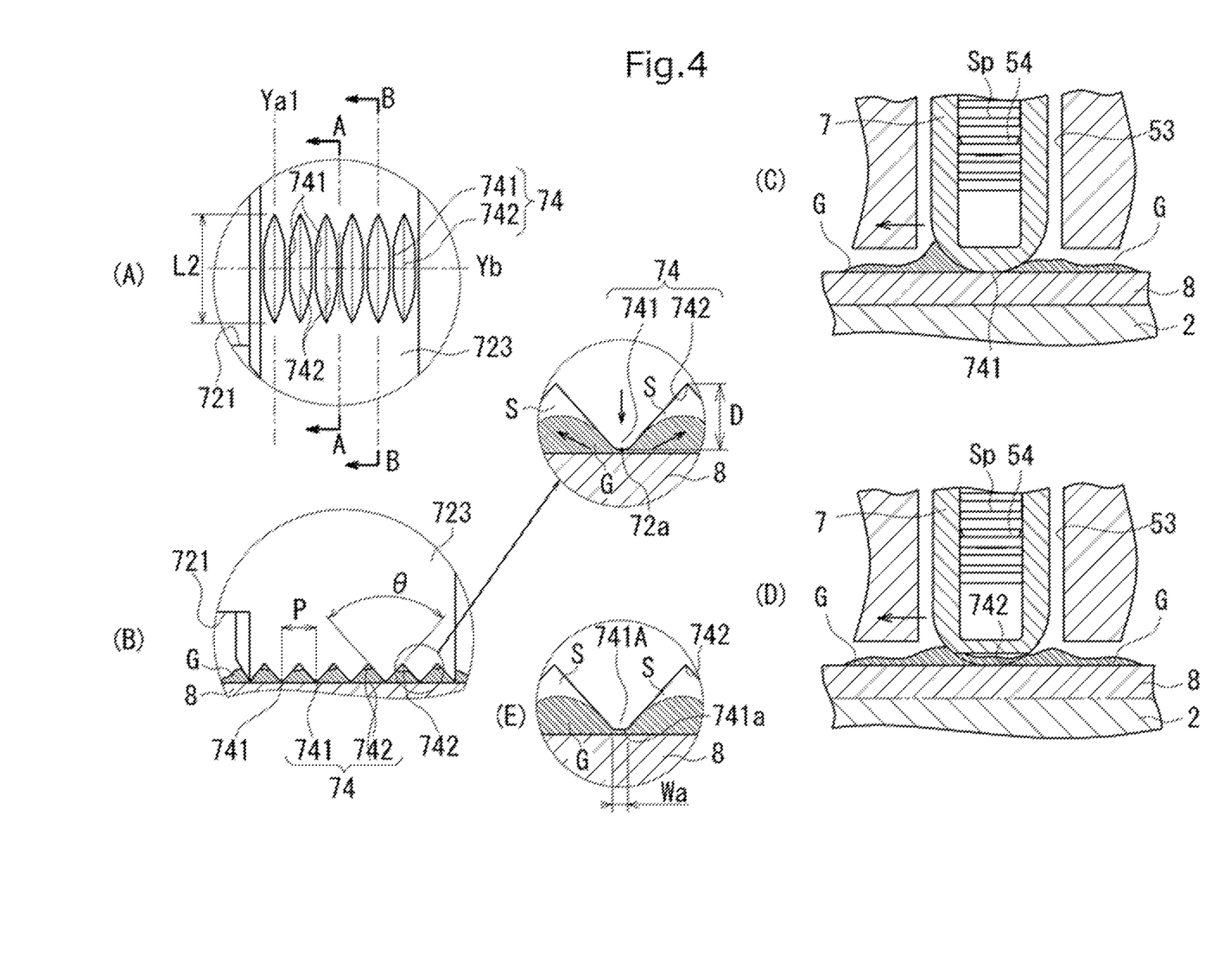
FIG. 4A is an enlarged diagram showing grooves formed in the movable contact point in an area A in FIG. 3C.
FIG. 4B is an enlarged diagram showing the grooves formed in the movable contact point in an area B in FIG. 3D.
FIG. 4C is a cross section showing the fixed contact point and a state of grease applied thereon, taken along lines A-A in FIG. 4A.
FIG. 4D is a cross section showing the fixed contact point and a state of grease applied thereon, taken along lines B-B in FIG. 4A.
FIG. 4E is a diagram for explaining a projecting portion in the movable contact point according to a modification in the present invention.

As described above, the outer periphery of the connecting portion 72 is formed in an arc shape in a side plane view, and each of the grooves 74 provided in the connecting portion 72 is formed in a spindle shape as viewed from downward to the side of the pole board 2 (refer to FIG. 3C and FIG. 4A).

In the present embodiment, an interval P between the adjacent projecting portions 741 and a ridge line angle θ of the projecting portion 741 are set such that a depth of each concave portion 742 from the lower end 72a of the connecting portion 72 has the same depth D (refer to FIG. 4B).

As shown in FIG. 3D, a notch portion 710 is formed in a central part of the movable contact point 7 between side wall portions 71 in the longitudinal direction, and this notch portion 710 is formed to have a width larger than a width W2 of the spring Sp. The spring Sp is arranged along the axis line Xa in the movable board 5, and an end portion of the spring Sp makes contact with the movable contact point 7 to bridge over the lower side 710a of the notch portion 710 of the one side wall portion 71 and the lower side 710a of the notch portion 710 of the other side wall portion 71. Thereby, the movable contact point 7 is urged downward to the side of the pole board 2 (refer to FIG. 3B).

An operation of the movable contact point 7 according to the present embodiment will be explained.

When the movable contact point 7 is in a position shown in a solid line in FIG. 2B, since the projecting portion 9 is not positioned under the getting-on portion 722 of the movable contact point 7, the one contact portion 723 and the other contact portion 723 in the movable contact point 7 in the longitudinal direction respectively make pressure-contact with the different fixed contact points 8 (8b and 8d) by an urging force of the spring Sp (refer to FIG. 2D).

When the movable board 5 rotates in a counterclockwise direction around the axis line X from this state, the movable contact point 7 moves in a direction shown in an arrow M in FIG. 2B. Then, at this time, the contact portions 723 of the movable contact point 7 slide and move in the circumferential direction around the axis line X on the corresponding fixed contact points 8 (8b and 8d).

Here, a plurality of grooves 74 along the movement direction of the movable board 7 are provided in the contact portion 723 of the movable contact point 7, and the respective grooves 74 are formed by lining up the sharp tip-shaped projecting portions 741 and the sharp tip-shaped concave portions 742 alternately on the connecting portion 72 (in the longitudinal direction of the contact portion 723) (refer to FIG. 4B).

Therefore, the urging force of the spring Sp concentrates on the tip-shaped projecting portion 741, and a force for pushing the projecting portion 741 downward to the side of the pole board 2 is increased to be larger.

Accordingly, the movable contact point 7 according to the present embodiment becomes in a state of being pushed to the fixed contact point 8 by a larger force than the conventional movable contact point in which the grooves 74 are not provided.

Then, even in a case where the fluidity of the grease G applied on the surface of the fixed contact point 8 is low, the sharp tip-shaped projecting portion 741 of the groove 74 scratches and separates the grease G to be able to make contact with the corresponding fixed contact point 8. Therefore, it is possible to certainly cause the movable contact point 7 (projecting portion 741) to make contact with the fixed contact point 8.

Here, a tip end portion of the sharp tip-shaped projecting portion 741 in the side of the fixed contact point 8 according to the present embodiment is formed in a round shape (refer to FIG. 4B), but may be formed in an angular shape having a sharp tip end in such a manner as to be able to scratch and separate the grease G more certainly.

Further, in the movable contact point 7 according to the present embodiment, the sharp tip-shaped concave portions 742 are positioned at both sides of the sharp tip-shaped projecting portion 741, and a space S is ensured between the movable contact point 7 (contact portion 723) and the fixed contact point 8 to be able to accommodate the grease G scratched and separated by the projecting portion 741 (refer to FIG. 4B).

In a case where this space is not ensured, since there is no escaping spot for the grease G, there are some cases where simply increasing the pushing force of the movable contact point 7 on the fixed contact point 8 does not enable the movable contact point 7 to certainly make contact with the fixed contact point 8.

In the movable contact point 7 according to the present embodiment, since the sharp tip-shaped concave portions 742, which serve as the escaping spots of the grease G scratched and separated by the projecting portion 741, are positioned at both the sides of the sharp tip-shaped projecting portion 741, it is possible to scratch and separate the grease G applied on the surface of the fixed contact point 8 to cause the contact portion 723 (projecting portion 741) of the movable contact point 7 to certainly make contact with the fixed contact point 8 (refer to FIG. 4B and FIG. 4C).

When the movable contact point 7 moves from the position shown by the solid line to the position shown in the virtual line in FIG. 3C (refer to an arrow M shown in FIG. 3C), the contact point 72 of the movable contact point 7 results in moving while scratching and separating the grease G applied on the surface of the fixed contact point 8.

In a case of the movable contact point where the groove 74 is not provided, it is not possible to easily move the grease G applied on the surface of the fixed contact point 8 from the upstream side to the downstream side in the movement direction of the movable contact point 7. Therefore, in a case where the liquidity of the grease G is low, there are some cases where the contact point 723 of the movable contact point 7 gets on the grease G. In this case, the contacting state between the movable contact point 7 and the fixed contact point 8 that should originally make contact with each other might possibly be lost or the chattering phenomenon due to the contact defect might possibly occur.

Here, in the movable contact point 7 according to the present embodiment, the groove 74 along the movement direction of the movable contact point 7 is provided in the contact portion 723, and thereby, the grease G applied on the surface of the fixed contact point 8 can move through the groove 74 from one side to the other side in the movement direction of the movable contact point 7 (from left to right in FIG. 4D).

Therefore, it is possible to appropriately suppress occurrence of the above phenomena that might possibly occur in a case of the movable contact point where the groove is not provided.

Further, as shown in FIG. 3C, each of the grooves 74 is formed in a spindle shape as viewed from downward to the side of the fixed contact point 8, widths of one side (upper side in the figure) and the other side (lower side in the figure) of the groove 74 in the movement direction of the movable contact point 7 are narrower, and this width becomes wider toward the center in the longitudinal direction (upper-lower direction in the figure) of the groove 74.

Therefore, at the time the movable contact point 7 moves, it is expected that a so-called orifice effect is achieved to the grease G flowing into the groove 74 from one side or the other side of the movable contact point 7 to accelerate the flowage of the grease G.

When the movable contact point 7 reaches the position shown in the virtual line in FIG. 2B, since the projecting portion 9b is positioned downward of the getting-on portion 722 of the movable contact point 7 in this position, the getting-on portion 722 of the movable contact point 7 gets on the projecting portion 9b (refer to FIG. 2C). Then, the contact portion 723 of the movable contact point 7 moves upward to the side of the cover 3 from the fixed contact point 8 to resolve the contacting state between the movable contact point 7 and the fixed contact point 8.

When the movable contact point 7 moves in a clockwise direction from the position shown in this virtual line, in a point where the getting-on portion 722 reaches an angular position shifted from a point right above the projecting portion 9b, the movable contact point 7 moves downward to the side of the fixed contact point 8 by the urging force of the spring Sp.

At this time, since the urging force of the spring Sp concentrates on the sharp tip-shaped projecting portion 741 to increase a pushing force of the projecting portion 741 downward to the side of the pole board 2, the sharp tip-shaped projecting portion 741 moves downward to the side of the pole board 2 while pushing and separating the grease to right and left sides to make contact with the corresponding fixed contact point 8b.

Hereinafter, a relation between an interval (pitch P) of the projecting portions 741 of the movable contact point 7 and a ridge line angle θ of the projecting portion 741, and a chattering generation rate will be explained.

Figure 5:
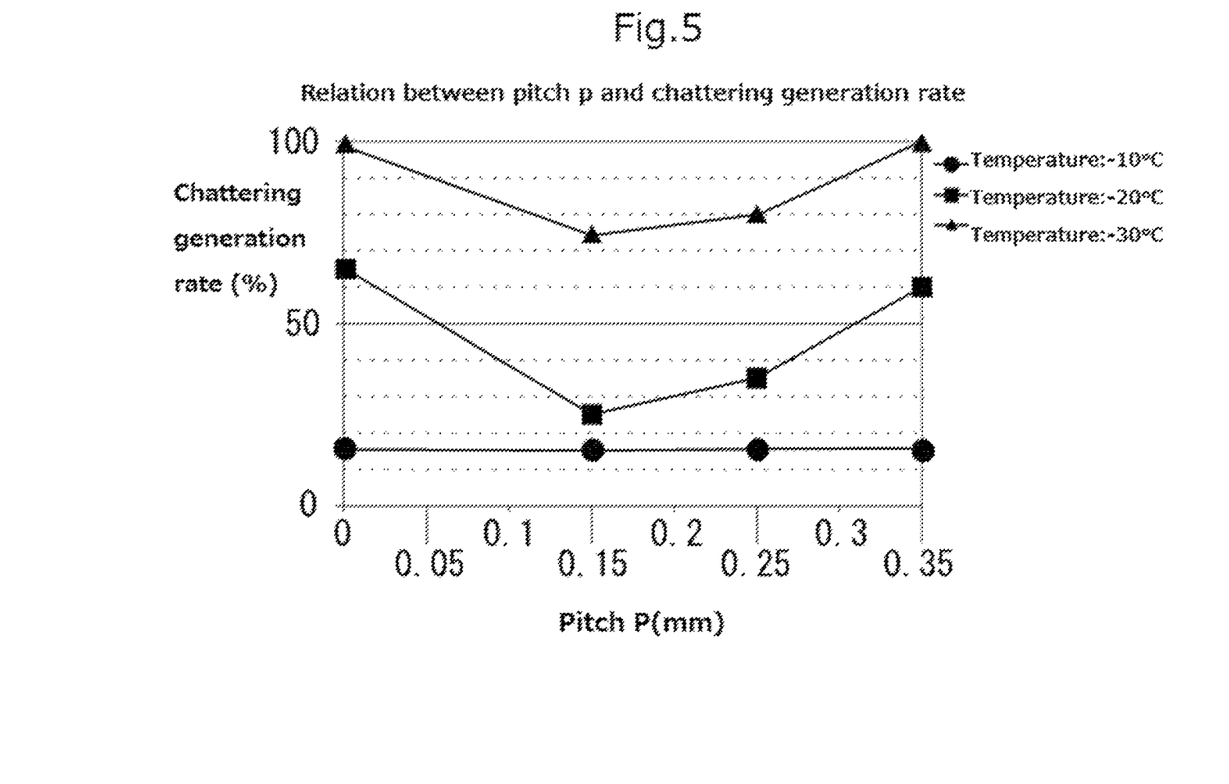
FIG. 5 is a diagram for explaining a relation of an interval between the projecting portions in the movable contact point and a chattering generating rate.

FIG. 5 is a diagram showing a relation between an interval (pitch P) of the projecting portions 741 of the movable contact point 7 and a chattering generation rate.

Figure 6:
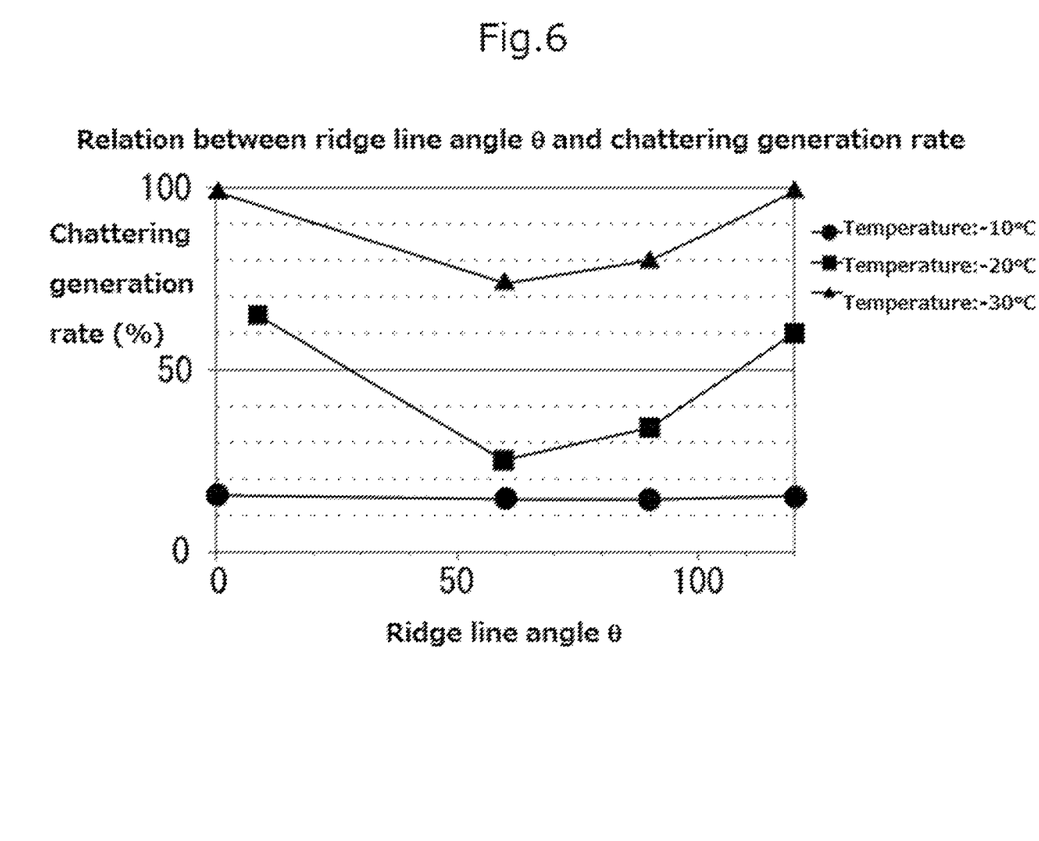
FIG. 6 is a diagram for explaining a relation of an ridge line angle of the projecting portion in the movable contact point and a chattering generating rate.

FIG. 6 is a diagram showing a relation between a ridge line angle θ of the sharp tip-shaped projecting portion 741 of the movable contact point 7 and a chattering generation rate.

It should be noted that FIG. 5 and FIG. 6 show experiment results under low-temperature environments (−10° C., −20° C. and −30° C.) in which the fluidity of the grease is low.

As shown in FIG. 5, the movable contact points 7 between which an interval between top points of the adjacent projecting portions 741 differs (pitch P: refer to FIG. 4B) were prepared, and chattering generation rates thereof were confirmed by changing a temperature of an environment for the checking.

As a result, at a temperature of −20° C. or less, the generation rate of the chattering was the lowest when the pitch P was 0.15 mm, and in the pitch P having a range of 0.15 mm to 0.25 mm, the more desirable experiment result regarding the generation rate of the chattering was obtained than in the movable contact point in which the grooves 74 were not provided (pitch=0 mm).

Therefore, in the movable contact point 7 according to the present embodiment, it is preferable that the pitch P of the projecting portions 741 is set in a range from 0.15 mm to 0.25 mm As shown in FIG. 6, the movable contact points 7 between which a ridge line angle θ of the projecting portion 741 (cross angle between one inclined surface and the other inclined surface of the projection 741: refer to FIG. 4B) differs were prepared to confirm chattering generation rates by changing a temperature of an environment for the checking.

As a result, at a temperature of −20° C. or less, the generation rate of the chattering was the lowest when the ridge angle θ is 60 degrees, and in the ridge line angle having a range of 60 degrees to 90 degrees, the more desirable experiment result regarding the generation rate of the chattering was obtained than in the movable contact point in which the grooves 74 were not provided (ridge line angle θ=0 degrees).

Therefore, in the movable contact point 7 according to the present embodiment, it is preferable that the ridge line angle θ of the projecting portion 741 is set in a range from 60 degrees to 90 degrees.

As described above, according to the present embodiment, in the inhibitor switch 1 in which the movable board 5 provided with the movable contact points 7 is rotatably provided around the axis line X inside the body case 4 (case) formed by coupling the cover 3 to the pole board 2 provided with the fixed contact points 8 on which the grease G (lubricating agent) is applied, and the movable contact point 7 making pressure-contact with the fixed contact point 8 by the urging force of the spring Sp moves in the circumferential direction around the axis line X with rotation of the movable board 5 to connect/disconnect the movable contact point 7 and the fixed contact point 8 in accordance with the angular position of the movable contact point 7 around the axis line X, the contact portion 723 of the movable contact point 7 with the fixed contact point 8 is provided with the plural grooves 74 formed along the movement direction of the movable contact point 7, and a plurality of grooves 74 are formed by lining up the sharp tip-shaped projecting portions 741 and the sharp tip-shaped concave portions 742 alternately in the radial direction of the axis line X so that the grease G applied on the fixed contact point 8 flows into the groove 74 (sharp tip-shaped concave portion 742) at the moving time of the movable contact point 7.

According to this configuration, the contact portion 723 of the movable contact point 7 with the fixed contact point 8 is provided with the plural grooves 74 formed along the movement direction of the movable contact point 7, and the grooves 74 are formed by lining up the sharp tip-shaped projecting portions 741 and the sharp tip-shaped concave portions 742 alternately in the radial direction of the axis line X. Therefore, stress (urging force of the spring Sp) for pushing the movable contact point 7 on the fixed contact point 8 concentrates on the sharp tip-shaped projecting portion 741 between the grooves 74, 74. As a result, the projecting portion 741 in the contact portion 723 in the movable contact point 7 is pushed to the side of the fixed contact point 8 by the force larger than the conventional movable contact point that is not provided with the grooves 74.

Accordingly, for example, even if the fluidity of the grease G is low as under the low-temperature environment, the projecting portion 741 in the contact portion 723 in the movable contact point 7 can scratch and separate the grease G to make contact with the fixed contact point 8. As a result, it is possible to appropriately prevent occurrence of the non-contacting state between the movable contact point 7 and the fixed contact point 8 that should originally make contact with each other.

Further, in a case of the conventional movable contact point where the groove is not provided, when there is no escaping spot for the grease G scratched and separated, in some cases the contact of the movable contact point with the fixed contact point is interrupted by the grease G. However, the contact portion 723 of the movable contact point 7 with the fixed contact point 8 is provided with the sharp-tip concave portion 742 into which the scratched and separated grease G can flow, and this concave portion 742 serves as an escaping spot of the grease G scratched and separated by the projecting portion 741, so that the scratch and separation of the grease G by the projecting portion 741 is not interrupted.

Therefore, since the projecting portion 741 provided in the contact portion 723 of the movable contact point 7 can scratch and separate the grease G on the fixed contact point 8 to certainly make contact with the fixed contact point 8, it is possible to appropriately suppress a contact defect between the movable contact point 7 and the fixed contact point 8 or occurrence of the chattering due to the contact defect.

Here, it is thought to increase the urging force of the spring Sp for causing the movable contact point 7 to certainly make contact with fixed contact point 8. In this case, however, since the contact pressure of the movable contact point 7 becomes large, when the sliding between the movable contact point 7 and the fixed contact point 8 is repeated by use of the inhibitor switch 1, abrasion of the respective contact portions between the movable contact point 7 and the fixed contact point 8 becomes large, and the abrasion powder is generated.

When the abrasion becomes large, the contact point between the movable contact point 7 and the fixed contact point 8 might possibly be shifted. When the abrasion powder is generated, the contact defect due to the movable contact point 7 getting on the abrasion powder might possibly occur.

As described above, it is not necessary to increase the urging force of the spring Sp because of forming the plural grooves 74 in which the sharp tip-shaped projecting portions 741 and the sharp tip-shaped concave portions 742 line up alternately in the radial direction of the axis line X. Therefore, in a case of the inhibitor switch 1 according to the present embodiment, it is possible to suppress occurrence of the problem to be generated in a case of increasing the urging force of the spring Sp.

Further, even if the mineral grease the fluidity of which is lowered under low-temperature environments is adopted, it is possible to cause the movable contact point 7 to certainly make contact with the fixed contact point 8. For example, fluorochemical grease is known as a lubricating agent the fluidity of which is not lowered under low-temperature environments, but the fluorochemical grease is more expensive than the mineral grease. Since the less expensive mineral grease can be used in the inhibitor switch 1 according to the present embodiment, reduction in manufacturing costs as the entire inhibitor switch 1 becomes possible.

The contact portion 723 of the movable contact point 7 has the arc-shaped outer periphery viewed from the radial direction of the rotary shaft (axis line X) of the movable board 5, and the grooves 74 are formed across the arc-shaped outer periphery of the contact portion 723 in the movement direction of the movable contact point 7, and the groove 74 (concave portion 742) is formed in the spindle shape as viewed from the side of the fixed contact point 8.

According to this configuration, the width between one side and the other side of the groove 74 in the movement direction of the movable contact point 7 is narrow, and this width is wider toward the center of the groove 74 in the longitudinal direction. Therefore, at the time the movable contact point 7 moves, it is expected that the so-called orifice effect is achieved to the grease G flowing into the groove 74 from the one side or the other side of the movable contact point 7 to accelerate the fluidity of the grease G.

Here, in the groove 74 provided in the contact portion 723, it is preferable that the interval (the pitch P) between the projecting portions 741 adjacent to each other in the radial direction of the axis line X is set in a range from 0.15 mm to 0.25 mm, and it is preferable that the ridge line angle θ of the projecting portion 741 is set in a range from 60 degrees to 90 degrees.

According to this configuration, even in a case where the low grease in fluidity is used as the lubricating agent, it is possible to appropriately suppress the generation rate of the chattering under low-temperature environments.

Particularly in a case where the groove 74 is provided with the projecting portions 741 in which both of the requirement of the interval (pitch P) between the projecting portions 741 and the requirement of the ridge line angle θ are met, it is possible to furthermore suppress the generation rate of the chattering under low-temperature environments.

Here, the projecting portion 741 is the sharp-tip projection the tip end portion of which is directed to the fixed contact point 8, and preferably the tip end portion is formed in the round shape or in the angular shape having a sharp tip end.

When the tip end portion of the projecting portion 741 is formed in the round shape, reduction in the sliding resistance at the time the movable contact point 7 slides on the fixed contact point 8 is possible. In addition, when the tip end portion of the projecting portion 741 is formed in the angular shape having the sharp tip end, since the grease G applied on the fixed contact point 8 can certainly be scratched and separated, even in a case where the fluidity of the grease G is low, the movable contact point 7 can more certainly be made contact with the fixed contact point 8.

As to the shape of the tip end portion of the projecting portion 741, various shapes may be adopted as long as the shape can scratch and separate the grease G applied on the fixed contact point 8.

For example, as shown in FIG. 4E, there may be adopted a plurality of grooves 74 formed in such a manner that a projecting portion 741A a tip end of which is provided with a flat portion 741a having a narrow width Wa is applied, and the projecting portions 741A and the concave portions 741 line up alternately in the radial direction of the axis line X.

Also with this configuration, the urging force of the spring Sp concentrates on the tip end of the projecting portion 741A, so that the projecting portion 741A is pushed to the side of the fixed contact point 8 by the force larger than the conventional movable contact point in which the groove 74 is not provided.

Accordingly, for example, even if the fluidity of the grease G is low as under the low-temperature environment, the projecting portion 741A in the contact portion 723 in the movable contact point 7 can scratch and separate the grease G to make contact with the fixed contact point 8. Therefore, it is possible to appropriately prevent occurrence of the non-contacting state between the movable contact point 7 and the fixed contact point 8 that should originally make contact with each other.

In the present embodiment, the mineral grease is exemplified as the lubricating agent to be applied on the fixed contact point 8, but fluorochemical grease may be adopted. In this case, at the moving time of the movable contact point 7, the contact between the movable contact point 7 and the fixed contact point 8 can certainly be made by flow of the fluorochemical grease G into the sharp-tip concave portion 742 forming part of the groove 74.

The above-mentioned present embodiment exemplifies a case of the switch in which the movable contact points are provided on the movable board 5 rotating around the axis line X and slide on the fixed contact points provided to form the arc shape in the circumferential direction around the axis line X, but a switch in which movable contact points slide on fixed contact points in the longitudinal direction or the width direction may be adopted.

In this case, the same effect as in the case of the above-mentioned present embodiment can be achieved by providing the movable contact point with grooves in the movement direction thereof.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

DESCRIPTION OF THE CODES 1, 10 Inhibiter switch
2 Pole board
3 Cover
4 Body case
5 Movable board
7 Movable contact point
8 (8a to 8d) Fixed contact point
9 (9a, 9b) Projecting portion
21 Through hole
22 Accommodation portion
24 Peripheral wall
24a Ring groove
25 Fitting groove
26 Connector portion
27 Connector terminal
29 Wiring member
31 Through hole
32 Accommodation portion
35 Fitting wall
40 Packing
41 Seal ring
51 Shaft portion
52 Contact point holding portion
53 Accommodation hole
54 Spring holding portion
71 Side wall portion
72 Connecting portion
74 Groove
710 Notch portion
722 Getting-on portion
723 Contact portion
741 Projecting portion
742 Concave portion
G Grease
Sp Spring

What is claimed is:

1. A switch comprising:
a body case;
a movable board that is movably disposed in the body case;
a metallic movable contact point disposed in the movable board;
a fixed contact point that is provided in the body case to be fixed thereto and on which a lubricating agent is applied, wherein the movable contact point makes pressure-contact with the fixed contact point, and is connected to/disconnected from the fixed contact point corresponding to a position of the movable contact point changing by moving the movable board; and
a plurality of grooves formed in a contact portion of the movable contact point with the fixed contact point to be arranged along a sliding direction of the movable contact point;
wherein the grooves are formed by lining up projecting portions and concave portions alternately, and extend continuously from one side to another side of the contact portion in the sliding direction;
an outer periphery of the contact portion is arc-shaped as viewed from a direction vertical to the sliding direction of the movable contact point; and
each groove is formed across the arc-shaped outer periphery in the sliding direction, and is formed in a spindle shape as viewed from a side of the fixed contact point.

2. A switch according to claim 1, wherein the projecting portions and the concave portions line up alternately in a direction vertical to the sliding direction of the movable contact point.

3. A switch according to claim 2, wherein an interval and a ridge line angle between the projecting portions are respectively set in such a manner that the grease scratched and separated by the projection portion can flow into the concave portion at the time the movable contact point moves.

4. A switch according to claim 3, wherein the interval between the projecting portions adjacent in a radial direction is in a range from 0.15 mm to 0.25 mm.

5. A switch according to claim 3, wherein a ridge line angle of the projecting portion is in a range from 60 degrees to 90 degrees.

6. A switch according to claim 1, wherein the projecting portion is a sharp tip-shaped projection a tip end portion of which is directed to the side of the fixed contact point, wherein the tip end portion is formed in an angular shape or in a round shape.

7. A switch according to claim 1, wherein:
the movable contact point is movable in a circumferential direction around a rotary shaft, and
the fixed contact point is formed in an arc shape along the circumferential direction around the rotary shaft.

8. A switch comprising:
a body case;
a movable board that is movably disposed in the body case;
a metallic movable contact point disposed in the movable board;
a fixed contact point that is provided in the body case to be fixed thereto and on which a lubricating agent is applied, wherein the movable contact point makes pressure-contact with the fixed contact point, and is connected to/disconnected from the fixed contact point corresponding to a position of the movable contact point changing by moving the movable board; and
a plurality of grooves formed in a contact portion of the movable contact point with the fixed contact point to be arranged along a sliding direction of the movable contact point;
wherein an outer periphery of the contact portion is arc-shaped as viewed from a direction vertical to the sliding direction of the movable contact point; and
wherein each groove is formed across the arc-shaped outer periphery in the sliding direction, and is formed in a spindle shape as viewed from a side of the fixed contact point.

* * * * *